US012641363B2

(12) United States Patent
Paul et al.

(10) Patent No.: US 12,641,363 B2
(45) Date of Patent: May 26, 2026

(54) LOUDSPEAKER SYSTEM WITH REDUCED REAR SOUND RADIATION OVER A WIDE FREQUENCY RANGE

(71) Applicant: d&b audiotechnik Gmbh & Co. KG, Backnang (DE)

(72) Inventors: Nico Paul, Backnang (DE); Matthias Christner, Ludwigsburg (DE)

(73) Assignee: d&b audiotechnik GmbH & Co. KG, Backnang (DE)

( * ) Notice: Subject to any disclaimer, the term of this patent is extended or adjusted under 35 U.S.C. 154(b) by 140 days.

(21) Appl. No.: 18/798,958

(22) Filed: Aug. 9, 2024

(65) Prior Publication Data

US 2025/0056152 A1 Feb. 13, 2025

(30) Foreign Application Priority Data

Aug. 10, 2023 (DE) ..................... 10 2023 121 413.6

(51) Int. Cl.

| | |
|---|---|
| ***H04R 1/28*** | (2006.01) |
| ***H04R 1/02*** | (2006.01) |
| ***H04R 1/32*** | (2006.01) |
| ***H04R 1/40*** | (2006.01) |
| ***H04R 3/04*** | (2006.01) |

(52) U.S. Cl.

CPC ........... *H04R 1/2849* (2013.01); *H04R 1/025* (2013.01)

(58) Field of Classification Search

CPC ...... H04R 1/2849; H04R 1/025; H04R 1/323; H04R 1/403; H04R 3/04; H04R 2430/00

USPC ......................... 381/345, 150, 332, 337, 386

See application file for complete search history.

(56) References Cited

U.S. PATENT DOCUMENTS

| | | | | |
|---|---|---|---|---|
| 8,842,866 | B2 | 9/2014 | Christner | |
| 10,477,299 | B2 | 11/2019 | Christner et al. | |
| 2017/0289675 | A1 | 10/2017 | Isotalo et al. | |
| 2018/0077485 | A1* | 3/2018 | Eichfeld | H04R 1/2803 |
| 2018/0131063 | A1* | 5/2018 | Zhu | H01P 1/2082 |
| 2021/0219069 | A1* | 7/2021 | Qi | H04R 1/2811 |

FOREIGN PATENT DOCUMENTS

| | | | |
|---|---|---|---|
| CN | 106331939 | A | 1/2017 |
| DE | 3317518 | A1 | 11/1984 |
| DE | 102006058009 | B3 | 2/2008 |
| DE | 102016124084 | A1 | 6/2018 |

* cited by examiner

*Primary Examiner* — Thjuan K Addy

(74) *Attorney, Agent, or Firm* — COOPER LEGAL GROUP LLC

(57) ABSTRACT

A loudspeaker system has a front loudspeaker housing with at least one first loudspeaker and a rear loudspeaker housing with at least one second loudspeaker. The rear loudspeaker housing is a bandpass housing with at least one first chamber and at least one second chamber. The first chamber has a first sound outlet, and the second chamber has a second sound outlet. The first sound outlet and the second sound outlet are arranged offset relative to one another with respect to a main radiation direction of the front loudspeaker housing.

20 Claims, 2 Drawing Sheets

LOUDSPEAKER SYSTEM WITH REDUCED REAR SOUND RADIATION OVER A WIDE FREQUENCY RANGE

CROSS-REFERENCE TO RELATED APPLICATION

The instant application claims priority to German Patent Application 10 2023 121 413.6, filed on Aug. 10, 2023, which is incorporated herein by reference.

TECHNICAL FIELD

The invention relates to a loudspeaker system with directional effect.

BACKGROUND

Loudspeaker systems with a low frequency sound source typically have low directivity (directional effect). This is due to the fact that lower frequencies in the audio frequency range have wavelengths that are comparable to or larger than the usual housing dimensions of the loudspeakers. Sound with a frequency of 100 Hz, for example, has a wavelength of 3.43 m. If the dimensions of a loudspeaker cabinet are significantly smaller, this frequency is radiated more or less omnidirectionally radiated. If, for example, a dispersion range of 90° (with −6 dB level with respect to the main axis) is required, a loudspeaker box with a width of 1 m, for example, can no longer provide this directional effect in the horizontal plane below around 300 Hz.

However, in sound technology, especially in the case of sound reinforcement for large-scale or open-air events, for example, it is desirable to be able to supply a defined audience area with sound pressure as evenly as possible with a loudspeaker, and as evenly as possible over the defined audience area and over as many frequency bands as possible that are relevant for the transmission (e.g. 40 Hz to 16 kHz). Ideally, the directional effect of the loudspeaker system should be constant over the entire frequency range. This means that measures that increase the directivity of a loudspeaker system (for a given housing size) are particularly desirable in the low frequency range.

In addition to providing the most uniform sound possible to a defined audience area, increased directivity can also be important in terms of noise protection, as it reduces sound emission in unwanted directions. Further, increased directivity can reduce the sound radiation from the rear, which means, for example, that less sound can be emitted to a stage and therefore a higher maximum gain can be achieved before feedback occurs.

It is already known to use so-called cardioid loudspeaker arrangements to reduce the rear sound. Cardioid loudspeaker arrangements use a low frequency loudspeaker located at the rear of the loudspeaker housing, which generates a countersound to the sound emitted from the front. The countersound cancels out the sound component emitted from the front low frequency loudspeaker to the rear and amplifies the sound component emitted from the front low frequency loudspeaker to the front.

SUMMARY

An object of the invention may be seen in the creation of an improved loudspeaker system with reduced rear sound radiation.

According to an aspect of the disclosure, a loudspeaker system can have a front loudspeaker housing with at least one first loudspeaker and a rear loudspeaker housing with at least one second loudspeaker. The rear loudspeaker housing is a bandpass housing with at least one first chamber and at least one second chamber. The first chamber has a first sound outlet and the second chamber has a second sound outlet. The first sound outlet and the second sound outlet are arranged offset relative to one another with respect to a main radiation direction of the front loudspeaker housing.

BRIEF DESCRIPTION OF THE DRAWINGS

Embodiments and examples of the invention are explained in more detail below with reference to the drawings. Identical reference signs denote identical or similar parts. Features of the illustrated embodiments may be selectively combined with each other, provided that they are not alternative or technically mutually exclusive features. Furthermore, features of the examples can be selectively omitted, provided they are not described as mandatory features in the description.

DETAILED DESCRIPTION

Figure 1:
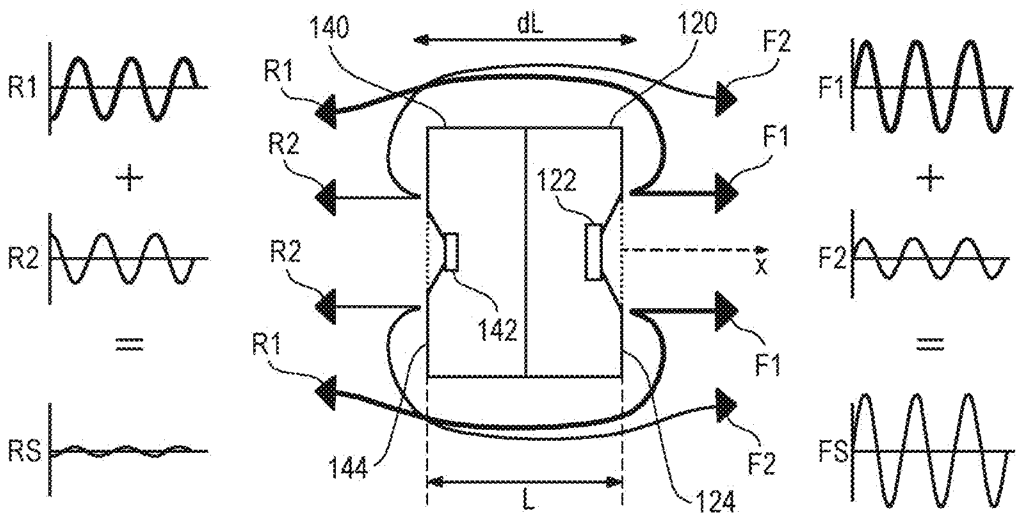
FIG. 1 is a schematic representation of the principle of rear sound reduction in a loudspeaker system with front and rear loudspeaker housings shown in plan view.

In the following, examples of loudspeaker systems are described by way of example. The term "loudspeaker system" can refer to a loudspeaker box in which the front loudspeaker housing (front loudspeaker enclosure) and the rear loudspeaker housing (rear loudspeaker enclosure) as well as, for example, cabling, crossover(s), damping materials, connection sockets, power amplifiers (in so-called self-powered systems) etc. are accommodated. The term "loudspeaker system" can, for example, also refer to a system that comprises or consists of several loudspeaker boxes, such as a system in which the front and rear loudspeaker housings each represent a loudspeaker box and these are arranged with respect to each other or connected to each other in the manner described below.

In the loudspeaker system according to this disclosure, the first sound outlet and the second sound outlet are arranged offset relative to one another with respect to a main radiation direction of the front loudspeaker housing. The offset arrangement of the sound outlets ensures that the condition for back-sound cancellation is fulfilled for different frequencies of the bandpass housing. This achieves a uniform, high attenuation of the return sound over an extended bandwidth range. In other words, the frequency dependence of the cardioid directional effect of the loudspeaker system is reduced, whereby the range of use of the loudspeaker system is extended, especially for higher frequencies (e.g. low-midrange frequency systems). It is also possible to add a high-frequency loudspeaker to the loudspeaker system according to the invention and thus, for example, to design it as a full-range loudspeaker system which, for example, transmits over the entire audio frequency range (e.g. 40 Hz to 16 kHz).

The bandpass housing can, e.g., have at least one first resonator and at least one second resonator with different resonant frequencies f1 and f2 respectively, the first resonator comprising the first chamber with the first sound outlet and the second resonator comprising the second chamber with the second sound outlet. As different frequencies for the reduction of return sound have different travel path differences between the sound diffracted around the loudspeaker system and the sound emitted directly, the offset arrangement of the first and second sound outlets may achieve improved attenuation over an increased frequency range.

For f1<f2, the first sound outlet should be further away from the front loudspeaker housing than the second sound outlet with respect to the main radiation direction, for example.

The two resonant frequencies f1 and f2 can vary over a wide range. Preferably, the ratio of the resonant frequencies f2/f1 is around 1.5 to 4, in particular around 2 to 3, for example.

The loudspeaker system can be designed as a low-frequency loudspeaker system (e.g. subwoofer), for example. In this case, f1 can be in a range from 30 to 50 Hz, for example, and f2 can be in a range from 70 to 110 Hz, for example.

Alternatively or additionally, the loudspeaker system can, e.g., also be designed as a low-midrange loudspeaker system. As the offset of the sound outlets means that high attenuation can be achieved, e.g. over significantly more than one octave, the rear sound cancellation can also be used in low-midrange loudspeaker systems, for example. In low-midrange loudspeaker systems, f1 can be in a range from 50 to 90 Hz, for example, and f2 can be in a range from 150 to 250 Hz, for example.

An advantageous structural realization is, for example, that the first sound outlet is arranged on a rear wall of the rear loudspeaker housing.

The second sound outlet, which is offset from the first sound outlet, can be arranged on a side wall of the rear loudspeaker housing, for example.

If a distance between a front wall of the front loudspeaker housing and the first sound outlet is L1 with respect to the main radiation direction, and a distance between the front wall of the front loudspeaker housing and the second sound outlet is L2, $L2/L1 \approx f1/f2$ can be set, for example. This allows resonant frequencies and sound paths to be approximately matched.

The first chamber and/or the second chamber can, e.g., each have several first or second sound outlets, respectively. In this way, symmetrical radiation behavior can be easily achieved, for example by arranging the multiple second sound outlets symmetrically to a plane containing the main radiation direction.

The first sound outlet may, e.g., have a first sound reflex tube (e.g. bass reflex tube) and/or the second sound outlet may, e.g., have a second sound reflex tube (e.g. bass reflex tube). In particular, the bandpass housing can be designed as a double bass reflex housing.

The front loudspeaker housing can also be vented (i.e. not closed, but open to the outside through one or more openings usually realized as tubes), for example. This enables loudspeaker systems with a higher efficiency above the resonant frequency of the resonator (formed by the housing with the sound reflex tube).

FIG. 1 shows a schematic representation of the principle of rear sound reduction in a loudspeaker system 100 with a loudspeaker housing 120 at the front and a loudspeaker housing 140 at the rear, viewed from above (i.e. e.g. from above, with the ceiling wall removed). The front loudspeaker housing 120 has a first loudspeaker 122 and the rear loudspeaker housing 140 has a second loudspeaker 142. The main radiation direction of the front loudspeaker housing 120 is labeled X.

The distance L between the front and rear sound sources is important for the attenuation or cancellation of the rear sound (in the direction of radiation −X). For example, this distance L can be given by the distance between a front wall 124 of the front loudspeaker housing 120 and a rear wall 144 of the rear loudspeaker housing 140.

The distance L between the front sound source and the rear sound source makes it possible for the sound emitted by the two loudspeakers 122, 142 to add up at the front in the main radiation direction X, while the sound emitted by the two loudspeakers 122, 142 largely cancels out at the rear in the opposite direction to the main radiation direction X. This is illustrated in FIG. 1 by the front and rear sound signals, where F1 denotes the sound emitted by the first loudspeaker 122 at the front (i.e. front-side), F2 denotes the sound emitted by the second loudspeaker 142 at the front (i.e. front-side), R1 denotes the sound emitted by the first loudspeaker 122 at the rear (i.e. read-side) and R2 denotes the sound emitted by the second loudspeaker 142 at the rear (i.e. rear-side).

FIG. 1 also illustrates that the first loudspeaker 122 can be more powerful than the second loudspeaker 142 because the sound R1 is attenuated as it travels around the loudspeaker system 100.

Sound cancellation of the superimposed rear sound RS with simultaneous addition of the sound components at the front (FS) can be achieved if the effective path difference dL between sound R1 diffracted around the loudspeaker system 100 and sound R2 radiated directly to the rear has the value $dL=\lambda/4$. In this case, the path difference dL between sound F2 diffracted around the loudspeaker system 100 and directly radiated sound F1 in the main radiation direction is also approximately $dL=\lambda/4$.

It should be noted that the effective path difference dL is slightly greater than the distance L between the front wall 124 and rear wall 144, as the main part of the sound wave travels around the loudspeaker system 100 at a certain distance depending on its wavelength. In addition, the effective path difference is frequency-dependent. At low frequencies, dL increases relative to L.

To achieve sound cancellation in the rear radiation direction, R1 and R2 must be in reverse phase at the desired cancellation location.

To achieve this, one possibility is to operate the second loudspeaker 142 with a loudspeaker signal that is in reverse phase to the loudspeaker signal with which the first loudspeaker 122 is operated and is also delayed by a time delay $\Delta t=(\lambda/4)\times 1/c$ with respect to the first loudspeaker 122 (in other words, the second loudspeaker 142 "waits" for the sound R1 arriving from the first loudspeaker 122). The reverse phase is usually caused by reversing the polarity of the loudspeaker inputs of loudspeaker 142. This results in the following wavelength difference for the rear sound RS:

$$\lambda/2(\text{polarity reversal})+\lambda/4(\text{time delay }\Delta t)-\lambda/4(\text{travel distance dL})=\lambda/2,$$

which corresponds to a phase difference of 180° and thus fulfills the condition for sound extinction. Here, c is the speed of sound in air and λ is a considered wavelength of the sound.

For the front side sound FS, the wavelength difference is:

$$\lambda/2(\text{polarity reversal})+\lambda/4(\text{time delay }\Delta t)+\lambda/4(\text{travel distance dL})=\lambda,$$

which leads to the in-phase (phase difference 360°) addition of signals F1 and F2.

Alternatively, the rear-side sound cancellation and the front-side sound amplification can also be achieved by operating the second loudspeaker 142 in phase (i.e. with the correct polarity) and delaying the loudspeaker signal for the first loudspeaker 122 by a time delay $\Delta t=(\lambda/4)\times 1/c$ with respect to the loudspeaker signal of the second loudspeaker 142. In this case, the first loudspeaker 122 "waits" for the sound arriving from the second loudspeaker 142. This procedure is also referred to as "end-fire".

A common feature of all known systems for reducing rear-side sound radiation is that the conditions for canceling out the rear-side sound RS (anti-phase of R1 and R2) with simultaneous addition of the front-side sound FS (in-phase of F1 and F2) are only well fulfilled for a relatively small frequency range (corresponding to a relatively small wavelength range). This leads to a deterioration of the attenuation (i.e. the level difference (in decibels) between FS and RS) the further the transmitted frequency moves away from the ideal frequency for maximum attenuation $f=c/(dL\times 4)$.

If a bandpass housing is used as the rear loudspeaker housing 140, this does not change the described frequency dependence of the attenuation. Although the bandpass housing in combination with a suitable front loudspeaker housing and a suitable housing dimensioning makes it possible to dispense with a polarity reversal of the first or second loudspeaker 122 or 142 and/or a time delay in the drive signal of the first and/or second loudspeaker 122 or 142 (i.e. the two loudspeakers 122, 142 can be driven with the same loudspeaker signal), the strong frequency dependence of the attenuation remains. And therefore, the significant deterioration of rear sound reduction remains the more the transmitted frequency deviates from the ideal frequency $f=c/(dL\times 4)$.

Figure 2:
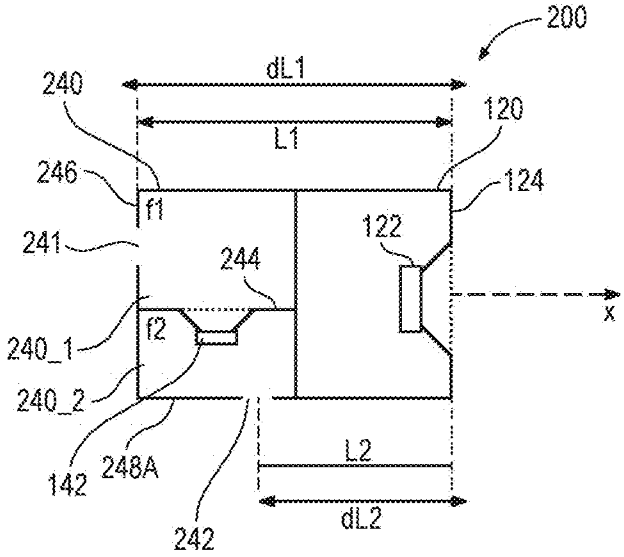
FIG. 2 is a schematic top view of the structure of an example of a loudspeaker system with reduced rear sound radiation over an extended bandwidth range.

In the example of a loudspeaker system 200 of FIG. 2, the front loudspeaker housing 120 can be realized as in FIG. 1. The rear loudspeaker housing 140 is a bandpass housing 240. The bandpass housing 240 has a first chamber 240_1 and a second chamber 240_2. The first chamber 240_1 has a first sound outlet 241 and the second chamber 240_2 has a second sound outlet 242. The first and second sound outlets 241, 242 are housing openings that connect the interior of the respective housing chambers 240_1 and 240_2 to the outside air. Such chambers 240_1, 240_2 connected to the outside are also referred to as "vented" chambers. The rear loudspeaker housing 140 of the loudspeaker system 200 can thus be referred to as a double-vented bandpass housing 240.

The bandpass housing 240 forms an acoustic double resonator that implements a $6^{th}$ order acoustic bandpass filter. The second loudspeaker 142 may be located, for example, on a partition wall 244 between the two chambers 240_1 and 240_2.

The first sound outlet 241 can, for example, be located on a rear wall 246 of the rear loudspeaker housing (bandpass housing 240). The second sound outlet 242 is arranged offset relative to the first sound outlet 241 with respect to the main radiation direction X of the front loudspeaker housing 120. The second sound outlet 242 may, for example, be located on a side wall 248A of the rear loudspeaker housing (bandpass housing 240).

The different positions of the first sound outlet 241 and the second sound outlet 242 with respect to the main radiation direction X are shown in FIG. 2 by different distances L1 and L2, at which the respective sound outlets 241 and 242 are spaced from the front sound source. For example, the front sound source may correspond to the location of the sound outlet on the front loudspeaker housing 120 given by the front wall 124 of the front loudspeaker housing 120. For example, the distance L1 may be measured between a center of the first sound outlet 241 and the front wall 124 of the front loudspeaker housing 120, while the length L2 is measured as the distance between a center of the second sound outlet 242 and the front wall 124 of the front loudspeaker housing 120.

As already mentioned, the bandpass housing 240 implements a double resonator with two different resonant frequencies f1 and f2. The resonant frequencies f1 and f2 are determined by the respective chamber volumes and, if present, by the geometric design (length, diameter, volume, etc.) of the (optional) sound reflex tubes (not shown in FIG. 2) at the respective sound outlets 241 and 242.

It may be provided that the first sound outlet 241 is further away from the front loudspeaker housing 120 than the second sound outlet 242 if the resonant frequency f1 of the first chamber 240_1 is lower than the resonant frequency f2 of the second chamber 240_2.

In other words, if $f1<f2$, the positions of the sound outlets 241, 242 can be selected according to $L1>L2$. This means that a lower frequency is emitted at the sound outlet that is further back (here the first sound outlet 241) than at the sound outlet (here the second sound outlet 242) that is further forward (where "further back" and "further forward" refer to the main radiation direction X).

In one example, a lower frequency f1 is emitted to the rear (first sound outlet 241) than to the side (second sound outlet 242), where the second chamber 240_2 emits at the higher resonant frequency f2.

The actual path differences between the sound emitted from the respective sound outlets 241 and 242 and the directly emitted sound are denoted by dL1 and dL2. The geometric offset L1-L2 of the first and second sound outlets 241, 242 can be selected so that $f1/f2=dL2/dL1$ applies. In this case, the path condition (λ/4 criterion) for the rear-side sound cancellation is "ideally" fulfilled for the frequencies f1 and f2. As the frequencies f1 and f2 are different and the path condition (λ/4 criterion) is approximately fulfilled in the intermediate frequency range, rear-side sound cancellation is achieved over a broader frequency range.

This also allows the loudspeaker system 200 to be used in higher frequency loudspeakers (e.g. low-midrange loudspeakers), i.e. it is not limited to subwoofers (pure low frequency loudspeakers).

For example, the geometric offset L1-L2 can be set according to $L2/L1\approx f1/f2$. For example, $L2/L1=(f1/f2)\pm 30\%$, $L2/L1=(f1/f2)\pm 20\%$ or $L2/L1=(f1/f2)\pm 10\%$ can be set, whereby all values in the mentioned ranges can be selected for the ratio L2/L1. As already mentioned, dL1>L1 and dL2>L2 apply. Furthermore, dL1-L1>dL2-L2 applies, since f1 is smaller than f2 and thus the distance at which sound of frequency f1 travels around the loudspeaker system 200 is greater than for sound of frequency f2. In addition, at the f2 resonator output 242, for example, sound is emitted laterally, i.e. the sound does not have to be bent by 180° around the loudspeaker system 200, but only by 90°.

By selecting the resonant frequencies f1 and f2, the frequency range in which an increased cancellation of return sound (improved attenuation) can be achieved can be set. In other words, the frequency dependence of the directional effect (directivity) of the loudspeaker system 200 can be specifically influenced. For example, the ratio f2/f1 can be set in a range from 1.5 to 4, in particular from 2 to 3.

For example, for a woofer loudspeaker system 200, f1 may be in a range of 30 to 50 Hz (e.g., at about 40 Hz) and f2 may be in a range of 70 to 110 Hz (e.g., at about 90 Hz). For example, if the loudspeaker system 200 is a low-midrange loudspeaker system, higher resonant frequencies f1, f2 are realized in the bandpass housing 240. For example, f1 may be in a range of 50 to 90 Hz (e.g., at about 70 Hz) and f2 may be in a range of 150 to 250 Hz (e.g., at about 200 Hz).

As already mentioned, by using a bandpass housing 240 as the rear loudspeaker housing 140, it can also be achieved that (unlike in the loudspeaker system 100 of FIG. 1) the first loudspeaker 122 and the second loudspeaker 142 can be operated with the same drive signal. This means that a time delay Δt in one of the control signals for the loudspeakers 122, 142 can optionally be dispensed with.

In other embodiments, the drive signals for the first loudspeaker 122 and the second loudspeaker 142 are different, for example by reversing the polarity of one of the loudspeakers 122, 142 and/or by introducing a time delay Δt in the drive signal of one of the loudspeakers 122, 142, for example as described with respect to FIG. 1.

Figure 3:
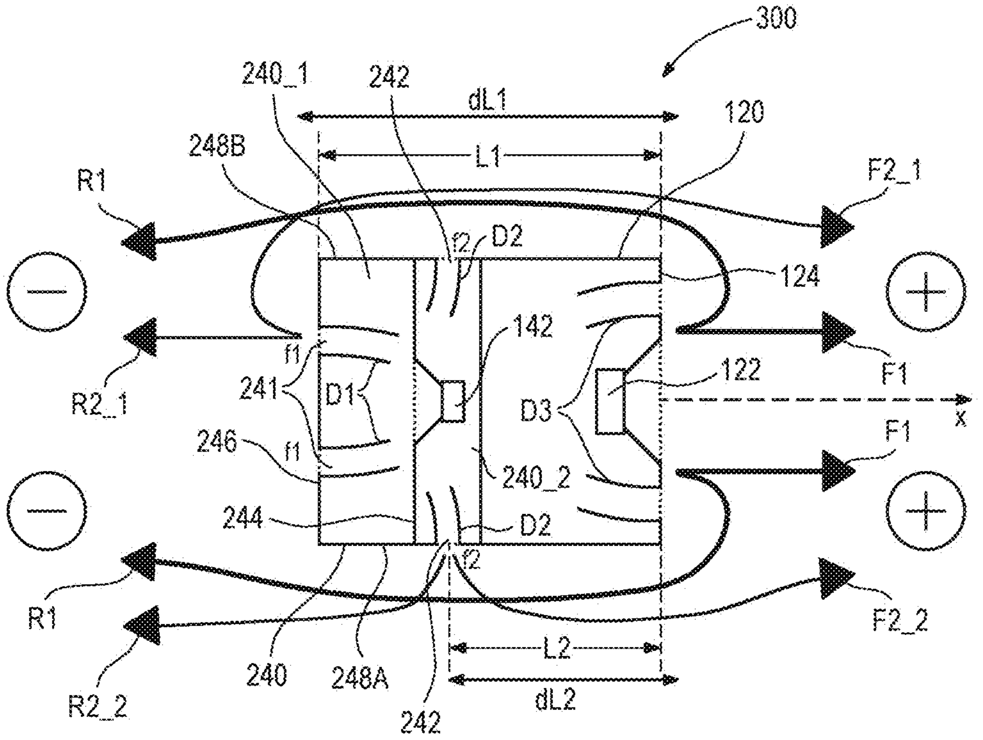
FIG. 3 is a schematic top view of the structure of another example of a loudspeaker system with reduced return sound radiation over an extended bandwidth range.

FIG. 3 shows a loudspeaker system 300 which differs from the loudspeaker system 200, for example, in that a plurality of first sound outlets 241 and/or a plurality of second sound outlets 242 may be provided. For example, the plurality of first sound outlets 241 and/or plurality of second sound outlets 242 are arranged symmetrically with respect to a plane containing the main radiation direction X (which is, for example, perpendicular to the plane of the paper). As a result, symmetrical radiation with respect to the main radiation direction X is achieved both for the rear-side sound RS and for the front-side sound FS. The two second sound outlets 242 of the second chamber 240_2 can, for example, be arranged on opposite side walls 248A, 248B of the bandpass housing 240.

Furthermore, FIG. 3 shows that the first sound outlet 241 and/or the second sound outlet 242 can be designed as sound reflex tube(s) D1 or D2. In this case, the resonant frequencies f1 and f2 are influenced both by the respective chamber volume and by the geometry of the respective sound reflex tube(s) D1 or D2. For example, a sound reflex tube D1 of the first sound outlet 241 can have a larger diameter and/or a larger volume than a sound reflex tube D2 of the second sound outlet 242.

In the embodiment example shown in FIG. 3, the partition wall 244 is oriented perpendicular to the main radiation direction X, for example. The first chamber 240_1 may, for example, be the rear chamber of the bandpass housing 240, while the second chamber 240_2 in this case represents the front chamber of the bandpass housing 242. However, the partition wall 244 can also be oriented inclined to the main radiation direction X or—as shown in FIG. 2—run parallel to it.

The front loudspeaker housing 120 of the loudspeaker system 300 is designed, for example, as a vented housing, i.e. in this case it contains at least one sound reflex tube D3 (or two or more sound reflex tubes D3). The sound reflex tube D3 can have a larger volume and/or diameter than the sound reflex tube D1 of the bandpass housing 240. Furthermore, the chamber volume of the front loudspeaker housing 120 can be larger than the sum of the chamber volumes of the bandpass housing 240.

As mentioned above, the first loudspeaker 122 may be more powerful than the second loudspeaker 142 because the sound R1 emitted from the rear of the first loudspeaker 122 loses intensity (sound pressure level) as it travels around the loudspeaker system 300.

In FIG. 3, R2_1 denotes the sound emitted by the second loudspeaker 142 at the rear of a first sound outlet 241, R2_2 denotes the sound emitted by the second loudspeaker 142 at the rear of the second sound outlet 242, F2_1 denotes the sound emitted by the second loudspeaker 142 at the front of the first sound outlet 241 and F2_2 denotes the sound emitted by the second loudspeaker 142 at the front of the second sound outlet 242. The actual path difference between R1 and R2_1 is denoted by dL1, and the actual path difference between R1 and R2_2 is denoted by dL2.

The condition for "ideal" rear-side sound attenuation at frequencies f1 and f2 is also $f1/f2=\lambda 2/\lambda 1=dL2/dL1$. Between the frequencies f1 and f2, approximate rear-side sound cancellation can be achieved.

Figure 4:
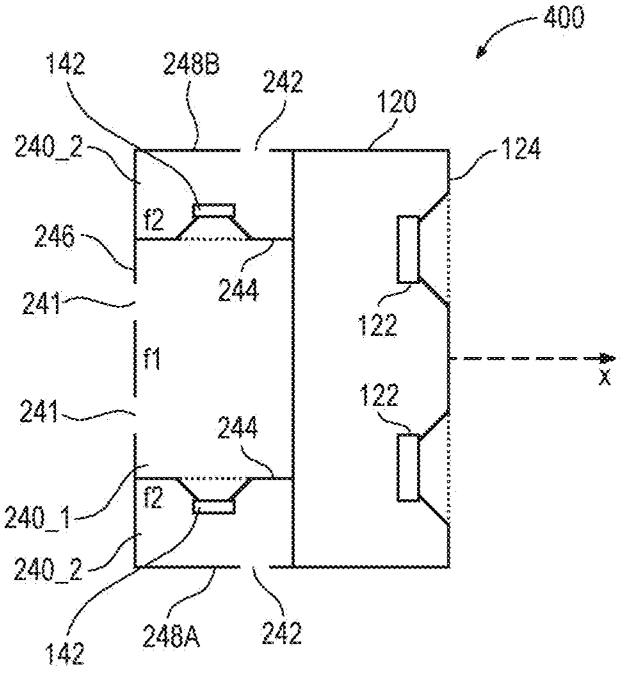
FIG. 4 is a schematic top view of the structure of another example of a loudspeaker system with reduced rear sound radiation over an extended bandwidth range.

In the loudspeaker system 300, the two resonators (or chambers 240_1, 240_2) of the bandpass housing 240 are arranged one behind the other with respect to the main radiation direction X. In other examples, the resonators of the bandpass housing 240 may be arranged side by side. FIG. 4 shows an example of a loudspeaker system 400 comprising, for example, a plurality of first loudspeakers 122 and/or a plurality of second loudspeakers 142. The loudspeaker system 400 is essentially created by mirroring the loudspeaker system 200 shown in FIG. 2 on the upper housing wall. To avoid repetition, reference is made to the above description.

As with the loudspeaker system 300 in FIG. 3, symmetrical dispersion behavior is achieved. In the bandpass housing 240 of the loudspeaker system 400, for example, a common chamber 240_1 is provided for the resonator of frequency f1 (separate chambers of the same frequency f1 would also be possible). On both sides of this resonator (or the corresponding chamber 240_1) there are two resonators (or chambers 240_2) of frequency f2 with sound outlets 242 suitably offset to the rear wall. The (ideal) cancellation of the rear sound RS at the frequencies f1 and f2 and the simultaneous (ideal) addition of the sound components of the front sound FS takes place in the manner already described.

A common feature of all embodiments is that the geometrically offset arrangement of the sound outlets 241, 242 of the bandpass housing 240 makes it possible to achieve uniform, high attenuation over a wide frequency range (e.g. significantly more than one octave).

Although specific examples have been illustrated and described herein, it will be appreciated by those of ordinary skill in the art that a variety of alternate and/or equivalent implementations may be substituted for the specific examples shown and described without departing from the scope of the present invention. This application is intended to cover any adaptations or variations of the specific examples discussed herein. Therefore, it is intended that this invention be limited only by the claims and the equivalents thereof.

The invention claimed is:

1. A loudspeaker system, comprising:

a front loudspeaker housing with at least a first loudspeaker, and a rear loudspeaker housing with at least one second loudspeaker, wherein the rear loudspeaker housing is a bandpass housing with at least one first chamber and at least one second chamber, the at least one first chamber has a first sound outlet, the at least one second chamber has a second sound outlet, and the first sound outlet and the second sound outlet are arranged offset relative to one another with respect to a main radiation direction of the front loudspeaker housing.

2. The loudspeaker system according to claim 1, wherein the bandpass housing comprises at least one first resonator and at least one second resonator with different resonant frequencies f1 and f2, respectively, wherein the first resonator comprises the at least one first chamber with the first sound outlet and the second resonator comprises the at least one second chamber with the second sound outlet.

3. The loudspeaker system according to claim 2, wherein the first sound outlet is further away from the front loudspeaker housing than the second sound outlet with respect to the main radiation direction, and f1<f2.

4. The loudspeaker system according to claim 2, wherein f2/f1 is in a range from 1.5 to 4.

5. The loudspeaker system according to claim 1, wherein the loudspeaker system is designed as a low-frequency loudspeaker system.

6. The loudspeaker system according to claim 2, wherein f1 is in a range from 30 to 50 Hz and f2 is in a range from 70 to 110 Hz.

7. The loudspeaker system according to claim 1, wherein the loudspeaker system is designed as a low-midrange loudspeaker system.

8. The loudspeaker system according to claim 2, wherein f1 is in a range of 50 to 90 Hz and f2 is in a range of 150 to 250 Hz.

9. The loudspeaker system according to claim 1, wherein the first sound outlet is arranged on a rear wall of the rear loudspeaker housing.

10. The loudspeaker system according to claim 1, wherein the second sound outlet is arranged on a side wall of the rear loudspeaker housing.

11. The loudspeaker system according to claim 2, wherein, with respect to the main radiation direction, a distance between a front wall of the front loudspeaker housing and the first sound outlet is L1, a distance between the front wall of the front loudspeaker housing and the second sound outlet is L2, and L2/L1≈f1/f2.

12. The loudspeaker system according to claim 1, wherein at least one of the at least one first chamber comprises a plurality of first sound outlets or the at least one second chamber comprises a plurality of second sound outlets, and wherein at least one of the plurality of first sound outlets or the plurality of second sound outlets are arranged symmetrically with respect to a plane containing the main radiation direction.

13. The loudspeaker system according to claim 1, wherein at least one of the first sound outlet has a first sound reflex tube or the second sound outlet has a second sound reflex tube.

14. The loudspeaker system according to claim 13, wherein at least one of a diameter or a volume of the first sound reflex tube is larger than at least one of a diameter or a volume of the second sound reflex tube.

15. The loudspeaker system according to claim 1, wherein the at least one second loudspeaker is arranged on a partition wall between the at least one first chamber and the at least one second chamber.

16. The loudspeaker system according to claim 1, wherein the at least one first chamber and the at least one second chamber of the bandpass housing are arranged one behind the other with respect to the main radiation direction.

17. The loudspeaker system according to claim 1, wherein the at least one first chamber and the at least one second chamber of the bandpass housing are arranged side by side with respect to the main radiation direction.

18. The loudspeaker system according to claim 1, wherein the bandpass housing comprises at least one of a plurality of first chambers or a plurality of second chambers.

19. The loudspeaker system according to claim 1, wherein the front loudspeaker housing is vented.

20. The loudspeaker system according to claim 2, wherein f2/f1 is in a range from 2 to 3.

* * * * *